C. A. PARSONS AND S. S. COOK.
POWER TRANSMISSION GEAR WHEEL.
APPLICATION FILED MAY 15, 1918.
1,351,401.
Patented Aug. 31, 1920.
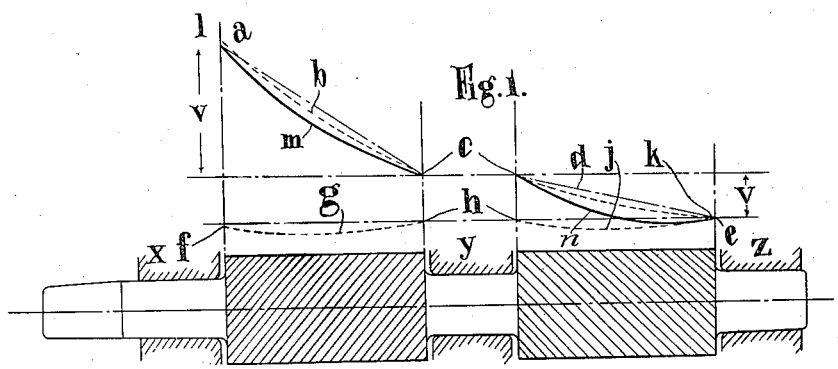
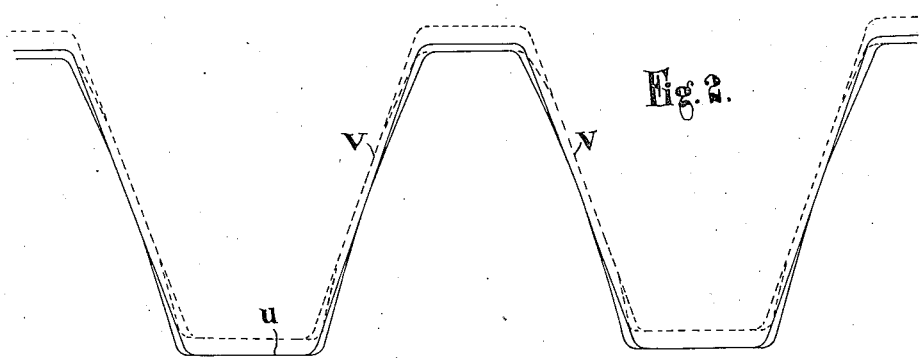
Inventors:
Charles Algernon Parsons,
Stanley Smith Cook,
by  *Middleton Donaldson*  Atty's.

UNITED STATES PATENT OFFICE.

CHARLES ALGERNON PARSONS, OF NEWCASTLE-UPON-TYNE, AND STANLEY SMITH COOK, OF WALLSEND, ENGLAND; SAID COOK ASSIGNOR TO SAID PARSONS.

POWER-TRANSMISSION GEAR-WHEEL.

1,351,401.  Specification of Letters Patent.  Patented Aug. 31, 1920.

Application filed May 15, 1918. Serial No. 234,827.

*To all whom it may concern:*

Be it known that we, CHARLES ALGERNON PARSONS and STANLEY SMITH COOK, both subjects of the King of Great Britain and Ireland, residing at Heaton Works, Newcastle-upon-Tyne, in the county of Northumberland, and Turbinia Works, Wallsend-on-Tyne, in the county of Northumberland, England, respectively, have invented certain new and useful Improvements in Power-Transmission Gear-Wheels, of which the following is a specification.

The present invention relates to the formation of the teeth of gears for power transmission and has for its object to construct gears with teeth of such form that under the designed conditions of power transmission the transmitted force will be substantially uniformly distributed across each of the faces of interengaging gear pairs.

It will be readily seen that the distribution of the transmitted force along the width of an intermeshing pinion and wheel is affected by the flexibility of the members. Flexibility of the teeth of either the driving or the driven member conduces to uniformity of distribution and is, therefore, not in this respect objectionable.

In speed reduction power transmission gears, the driven member is necessarily large in diameter relative to the driving member and the torsional flexibility of the driven member is, therefore, usually so small as to be negligible while that of the driving member is considerable, so considerable, in fact, as to place a serious limitation upon the practicable width of gears as ordinarily constructed.

Bending between the supporting bearings also has an effect upon the distribution of the transmitted force.

In regard to bending, again the flexibility of the large diameter driven member of a speed reducing gear is usually negligible, while that of the driving pinion is appreciable (though not so great in effect as the torsional flexibility for the proportions ordinarily adopted in practice). It is obvious that the bending of the pinion between its bearing supports due to the force transmitted also causes inequality of the distribution of this force.

It is seen, therefore, that the susceptibility of the pinion to torsional and bending flexure is the prime factor in causing unequal distribution of the force transmitted along the face of the gears.

Referring to the accompanying drawings:—

Figure 1 shows a double helical pinion with a diagram showing the distribution of forces across the gear.

Fig. 2 is a diagram showing the correction applied according to the invention.

In the case of a double helical gear pinion to which the turning force is applied at the outer end of one of the helices, assuming that the force is uniformly distributed across the face of the gears, the torque diminishes uniformly across the width from a maximum at the driving end to nothing at the other end of the face. The corresponding torsional deflection, measured, say at the pitch circle of the teeth, may be represented by a parabolic curve when plotted on a base representing the width of the gear face, the ordinates of the curves representing the torsional deflection and abscissæ distances along the face measured from the driving end of the helices.

In the case of a double helical gear the torsional deflection will be represented by two parabolic curves, $a\ b\ c$, $c\ d\ e$, the torsional deflection of the shaft between the two helices being left out of consideration as it has no influence on the distribution. The deflection due to bending of the pinion will depend upon the disposition of the supporting bearings, and in the case of a pinion supported by three bearings $x\ y\ z$, as shown, one at each end and one between the two parts of the double helical pinion, the deflection measured at the pitch line of the teeth may be represented by a curve $f\ g\ h$, $h\ j\ k$. Superposing the two curves, namely, that representing torsional deflection and that representing deflection due to bending, a curve $l\ m\ o$, $c\ n\ e$ is obtained whose ordinates are substantially diminished across the face of each part of the pinion from the side on which power is applied to the opposite side, and when under load the gear teeth have a deflection corresponding to this resultant curve uniform distribution of force across the face of the teeth will be obtained.

It will, therefore, be seen that if the two interengaging sets of teeth are so formed that when no force is being transmitted, and when they are in contact at the ends remote from the source of power, the engaging faces are separated at each part of the width by an amount represented by the resultant deflection curve; then, when transmitting the designed force, this force will be uniformly distributed along the width of the gear face.

On plotting the curves representing the deflection due to torsion and the deflection due to bending it will be seen that a close approximation to the resultant curve can be obtained by drawing two straight lines inclined to the axis of the pinion, the inclination of the two lines being in the case considered different for the two parts of the double helical pinion.

In the construction of gears for transmission of large powers the teeth are usually formed by the generating process in which a hob is used having cutting teeth with straight sided flanks and a slight outward taper, as shown in Fig. 2, so that an increase $u$ in the depth of penetration of the hob into the work causes a decrease $2v$ in the thickness of the teeth cut on the blank measured at a given distance from the axis of the work, for instance, at the pitch circle.

The invention consists in pinions or gear wheels having their teeth of substantially the form required to give uniform distribution of force across the face of the teeth at a given considerable load, the shape of the teeth being arrived at from the consideration of the torsional deflection and the deflection due to bending.

The invention further consists in pinions or gear wheels having their teeth of substantially the form required to give uniform distribution of force across the face of the teeth at a given load, the teeth being shaped in a machine designed to take into account the torsional deflection and the deflection due to bending.

The invention moreover consists in pinions or gear wheels in which the slot between each tooth is of greater depth at one end than at the other.

The invention also consists in the improved form of gear teeth herein described.

In carrying the invention into effect, I so form the teeth that they are of greater height at one end of the wheel than at the other, or in other words the depth of the slot between each tooth is greater at one end than at the other, the greater depth being of course nearer to the driving end of the pinion. This effect may be attained in any desired manner.

The correction may be made on either wheel or pinion or partially on both, but it is generally preferred to make it on the pinion on account of its smallness, for convenience of machining. In the case of two or more pinions of different dimensions or transmitting different forces to the same wheel, it will be only possible to make the corrections properly on the pinions.

In the case we have described the depth of slot between each tooth is decreased in the same direction for each half of the pinion, but in cases in which the torque is applied between the halves of the pinion the decrease will be in opposite directions on the two halves.

It will be seen that the proposed modifications in the shape of the teeth will only produce uniform distribution at one power and we prefer to make the correction for the highest normal power under which condition high stresses are encountered. The correction would still have a beneficial effect at overload powers but would not produce quite such uniform distribution. At very low powers the correction would actually cause the distribution to be more unequal, but as the forces and stresses under such low power conditions are small, this uneven distribution at low powers can be disregarded.

What we claim is:—

1. A pinion or gear wheel having teeth of substantially the form to give uniform distribution of force across the face of the teeth at a given load to compensate for torsional deflection and the deflection due to bending, said gear having its teeth varying progressively across the gear face in relation to the axial center of said gear, substantially as described.

2. Pinions or gear wheels having the spaces between the teeth cut of uniformly and progressively varying depths from one end of the gear to the other whereby the teeth vary progressively in height from end to end of the gear to give uniform distribution of force across the tooth face under the deflection due to torsion and bending resulting from the transmission of a given load.

In testimony whereof we have signed our names to this specification.

CHARLES ALGERON PARSONS.
STANLEY SMITH COOK.